United States Patent Office 3,185,688
Patented May 25, 1965

1

3,185,688
3,6-DIAMINO-N-(SUBSTITUTED)-2-QUINOXALINE
CARBOXAMIDES
Thomas S. Osdene, Berwyn, Pa., assignor to American
Home Products Corporation, New York, N.Y., a corporation of Delaware
No Drawing. Filed July 24, 1963, Ser. No. 297,232
3 Claims. (Cl. 260—250)

This invention relates to novel quinoxalinecarboxamides possessing useful pharmacological properties. More particularly, the invention is concerned with compounds having a 3,6-diamino-2-quinoxalinecarboxamide nucleus having a tert-aminoalkyl, an alkoxyalkyl or an alkylthioalkyl substituent on the nitrogen atom of the carboxamido group. Optionally, the compounds of the invention may have a lower alkyl group in the 7-position and on the nitrogen atom of the carboxamido group.

Preferred compounds in accord with this invention are represented by the following general formula:

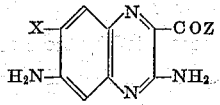

wherein Z is

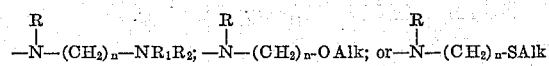

X and R represent hydrogen or lower alkyl radical preferably having from 1 to 5 carbon atoms.

$R_1$ and $R_2$ represent lower alkyl groups, preferably having up to 5 carbon atoms, and when taken together to form a closed ring represent a morpholino, piperidino or pyrrolidino radical and Alk represents a lower alkyl group having up to 4 carbon atoms.

The letter "n" represents a number ranging from 2 to 4, inclusive.

The compounds of the invention are prepared by reacting in an anhydrous alcohol such as methanol or 2-ethoxyethanol in the presence of a catalytic amount of a basic catalyst, preferably sodium metal, a 2,4-diamino-1-nitrosobenzene or a 2,4-diamino-5-lower alkyl-1-nitrosobenzene with 2-cyano-N-(tert-aminoalkyl)acetamide or 2-cyano-N-(alkoxyalkyl)acetamide, 2-cyano-N-(alkylthioalkyl)acetamide or their N-lower alkyl derivatives or acetamide. These starting compounds are prepared by reacting ethyl cyanoacetate with the appropriate amine with or without a solvent. In preparing the compounds of this invention, the above-named reactants are refluxed with agitation for about two to 4 hours. After this period of time, the reaction mixture is cooled and evaporated to dryness, unless the compound crystallizes from the solution. The dry residue is then recrystallized.

The following examples illustrate the practise of this invention:

EXAMPLE 1

*3,6-diamino-N-(3-diethylaminopropyl)-2-quinoxalinecarboxamide*

To a solution of 0.2 g. of sodium in 400 ml. of absolute ethanol was added 5.48 g. of 2,4-diamino-1-nitrosobenzene followed by 8.5 g. of 2-cyano-N-(3-diethylaminopropyl)acetamide. The mixture was stirred and boiled under reflux for 2 hrs., after which it was filtered. The solution was evaporated to dryness on a rotary evaporator and the residue was treated with 150 ml. of water. An oil was deposited which solidified on scratching. After cooling this was removed by filtration yielding material, M.P. 101–102°, wt.=13.0 g. Recrystallization from aqueous ethanol followed by crystallization from benzene afforded 3,6 - diamino - N - (3 - diethylaminopropyl) - 2 - quinoxalinecarboxamide, M.P. 131–132°.

*Analysis.*—Calculated: C=60.73, H=7.65, N=26.56. Found: C=61.02, H=7.70, N=26.84.

EXAMPLE 2

*3,6-diamino-N-(2-diethylaminoethyl)-7-methyl-2-quinoxalinecarboxamide*

To a solution of 0.2 g. of sodium in 400 ml. of absolute ethanol was added 4.5 g. of 2,4-diamino-5-methyl-1-nitrosobenzene followed by 7.0 g. of 2-cyano-N-(2-diethylaminoethyl)acetamide. The mixture was stirred and boiled under reflux for 2 hours. After cooling, the mixture was concentrated to dryness on a rotary evaporator to give a brown material, M.P. 145–146°. Recrystallization from ethanol, followed by crystallization from benzene afforded 3,6-diamino-N-(2-diethylaminoethyl)-7-methyl-2-quinoxalinecarboxamide, M.P. 152–153°.

*Analysis.*—Calculated: C=60.73, H=7.65, N=26.56. Found: C=60.97, H=7.56, N=26.73.

EXAMPLE 3

Reacting 2,4-diamino-5-pentyl-1-nitrosobenzene with 2-cyano-N-pentyl-N-(3-diethylaminopropyl)acetamide or 2-cyano-N-pentyl-N-(2-ethoxyethyl)acetamide or with 2 - cyano-N-(2-ethylthioethyl)acetamide according to either of the procedures given in Examples 1 or 2, yields 3,6-diamino-N-pentyl-N-(3-diethylaminopropyl)-7-pentyl-2-quinoxalinecarboxamide, 3,6-diamino-N-pentyl-N-(2-ethoxyethyl)-7-pentyl-2-quinoxaline carboxamide and 3,6-diamino - N - pentyl-N-(2-ethylthioethyl)-2-quinoxalinecarboxamide, respectively.

In a manner similar to the method exemplified in Example 1, other quinoxalines are made by reacting 2,4-diamino-1-nitrosobenzene with the appropriate cyanoacetamide as indicated in the following table.

| Cyanoacetamide derivative used | Name of product |
| --- | --- |
| 2-cyano-N-(2-dimethylaminoethyl)acetamide. | 3,6-diamino-N-(2-dimethylaminoethyl)-2-quinoxalinecarboxamide. |
| 2-cyano-N-(2-morpholinoethyl)acetamide. | 3,6-diamino-N-(2-morpholinoethyl)-2-quinoxalinecarboxamide. |
| 2-cyano-N-(2-piperidinoethyl)acetamide. | 3,6-diamino-N-(2-piperidonethyl)-2-quinoxalinecarboxamide. |
| 2-cyano-N-(2-diisopropylaminoethyl)acetamide. | 3,6-diamino-N-(2-diisopropylaminoethyl)-2-quinoxalinecarboxamide. |
| 2-cyano-N-methyl-N-(2-dimethylaminoethyl)acetamide. | 3,6-diamino-N-methyl-N-(2-dimethylaminoethyl)-4-quinoxalinecarboxamide. |
| 2-cyano-N-(3-dimethylaminopropyl)acetamide. | 3,6-diamino-N-(3-dimethylaminopropyl)-2-quinoxalinecarboxamide. |
| 2-cyano-N-(3-di-n-butylaminopropyl)acetamide. | 3,6-diamino-N-(3-di-n-butylaminopropyl)-2-quinoxaline carboxamide. |
| 2-cyano-N-(2-pyrrolidinoethyl)acetamide. | 3,6-dimino-N-(2-pyrrolidinoethyl)-2-quinoxalinecarboxamide. |
| 2-cyano-N-(4-dimethylaminobutyl)acetamide. | 3,6-diamino-N-(4-dimethylaminobutyl)-2-quinoxalinecarboxamide. |
| 2-cyano-N-(2-dimethylaminopropyl)acetamide. | 3,6-diamino-N-(2-dimethylaminopropyl)-2-quinoxalinecarboxamide. |
| 2-cyano-N-(2-methoxyethyl)acetamide. | 3,6-diamino-N-(2-methoxyethyl)-2-quinoxalinecarboxamide. |
| 2-cyano-N-(2-ethylthioethyl)acetamide. | 3,6-diamino-N-(2-ethylthioethyl)-2-quinoxalinecarboxamide. |

In a manner similar to the method exemplified in Example 2, other quinoxalines are prepared by reacting 2,4- diamino-5-methyl-1-nitrosobenzene with the appropriate cyanoacetamide as indicated in the following table.

| Cyanoacetamide derivative used | Name of product |
|---|---|
| 2-cyano-N-(2-dimethylaminoethyl)-acetamide. | 3,6-diamino-N-(2-dimethylaminoethyl)-7-methyl-2-quinozalinecarboxamide. |
| 2-cyano-N-(3-morpholinopropyl)-acetamide. | 3,6-diamino-N-(3-morpholinopropyl)-7-methyl-2-quinoxalinecarboxamide. |
| 2-cyano-N-ethyl-N-(2-dimethylaminoethyl)acetamide. | 3,6-diamino-N-ethyl-N-(2-dimethylaminoethyl)-7-methyl-2-quinoxalinecarboxamide. |
| 2-cyano-N-(4-diethylaminobutyl)-acetamide. | 3,6-diamino-N-(4-diethylaminobutyl)-7-methyl-2-quinoxalinecarboxamide. |
| 2-cyano-N-(3-diethylaminopropyl)-acetamide. | 3,6-diamino-N-(3-diethylaminopropyl)-7-methyl-2-quinoxalinecarboxamide. |
| 2-cyano-N-(3-isopropoxypropyl)-acetamide. | 3,6-diamino-7-methyl-N-(3-isopropoxypropyl)-2-quinoxalinecarboxamide. |
| 2-cyano-N-(2-ethoxyethyl)acetamide. | 3,6-diamino-N-(2-ethoxyethyl)-7-methyl-2-quinoxalinecarboxamide. |
| 2-cyano-N-(2-n-butylthioethyl)-7-methyl-2-quinoxalinecarboxamide. | 3,6-diamino-N-(2-n-butylthioethyl)-7-methyl-2-quinoxalinecarboxamide. |

When tested pharmacologically, the compounds of this invention exhibited tranquilizing activity. In addition, these compounds are useful in exploring biological mechanisms in laboratory animals.

The compounds of this invention can be administered in a wide variety of oral or parenteral unit dosage forms, singly or in admixture with other active compounds.

The present invention also includes the process of bringing the compounds thereof into a form suitable for therapeutic administration by associating them with liquids or solids, pharmacetutically acceptable carriers.

Various changes and modifications of this invention can be made by those skilled in the art to which it relates and to the extent that such variations incorporate the spirit of the invention, they are included in the scope of the claims.

What is claimed is:
1. A compound of the formula

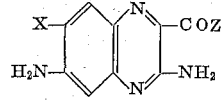

wherein

Z is selected from the group of:

$$-\underset{|}{\overset{R}{N}}-(CH_2)_n-NR_1R_2; \quad -\underset{|}{\overset{R}{N}}-(CH_2)_n-OAlk; \quad \text{and} \quad -\underset{|}{\overset{R}{N}}-(CH_2)_n-SAlk$$

wherein

X and R are selected from the group of hydrogen and lower alkyl radicals having from 1 to 5 carbon atoms;

$R_1$ and $R_2$ are lower alkyl groups, having up to 5 carbon atoms, and when taken together form a closed ring selected from the group consisting of morpholino, piperidino and pyrrolidino; and Alk represents a lower alkyl group having up to 4 carbon atoms; and $n$ represents a number ranging from 2 to 4.

2. 3,6 - diamino - N - (3 - diethylaminopropyl)-2-quinoxalinecarboxamide.

3. 3,6 - diamino - N - (2-diethylaminoethyl)-7-methyl-2-quinoxalinecarboxamide.

References Cited by the Examiner

Osdene et al.: J. Chem. Soc., London (1955), pages 2027–31.

NICHOLAS S. RIZZO, *Primary Examiner.*